United States Patent Office 2,796,431
Patented June 18, 1957

2,796,431

6-HYDROXY AND 7-HYDROXY DERIVATIVES OF 1,4a - DIMETHYLPERHYDROPHENANTHRENE-1-CARBOXYLIC ACID

Roy H. Bible, Jr., Chicago, and Willard M. Hoehn, Wilmette, Ill., assignors, by mesne assignments, to G. D. Searle & Co., Skokie, Ill., a corporation of Delaware No Drawing. Application July 16, 1954,
Serial No. 443,974

8 Claims. (Cl. 260—514)

Our present invention relates to two new isomeric organic acids and to methods for their synthesis. More particularly, it relates to 6-hydroxy and 7-hydroxy derivatives of 1,4a-dimethylperhydrophenanthrene-1-carboxylic acid and to their preparation. The compounds of our invention can be represented by the general structural formula

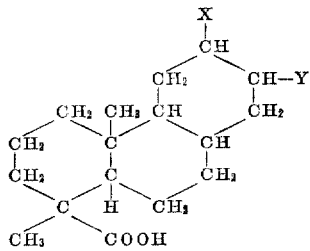

wherein one of the radicals X and Y is a hydroxyl and the other is a hydrogen atom.

The new acids of our invention have a number of valuable pharmacological properties both as secretagogues and hormonal agents. These acids have been found to produce a high degree of choleresis. Also they produce a cortisone-like action as evidenced by their thymolytic effect.

The new acids are also of great value as intermediates in the synthesis of other medicinally valuable compounds. Thus they can be esterified by conventional means to form the lower alkyl esters which are of value as estrogenic and choleretic agents. Of special interest as cardiovascular agents and spasmolytics are the lower dialkylaminoalkyl esters, piperidinoalkyl esters and morpholinoalkyl esters. Quaternization of these esters yields ganglion blocking agents.

Another group of valuable compounds is obtained by treatment of our acids and their esters with lithium aluminum hydride whereby the 1-carboxy group is converted to a 1-hydroxymethyl group.

Still further potent secretagogic compounds are obtained when the 6-hydroxy- and 7-hydroxy-1,4a-dimethylperhydrophenanthrene-1-carboxylic acids are oxidized with chromic acid whereby they are converted to the 6-oxo- and 7-oxo-1,4a-dimethylperhydrophenanthrene-1-carboxylic acids, which can then be esterified by conventional means.

Our invention provides a synthesis of 1,4a-dimethyl-6-hydroxyperhydrophenanthrene-1-carboxylic acid from podocarpic acid by hydrogenation at an elevated temperature in the presence of certain catalysts. One of the most efficient reducing agents for this synthesis is Adams' platinic oxide catalyst. With this catalyst it is advantageous to use a temperature range of 35–150° C. In the lower part of this temperature range a time of several days is required for the reaction while around 100° C. the reaction can be completed in a few hours. Excessively high temperatures should be avoided since they favor side reactions. The process using Adams' catalyst can be conducted advantageously in such solvents as the lower alkanoic acids, e. g. aqueous acetic, glacial acetic, propionic acid, and the like. Another useful catalyst is Raney nickel (cf. Organic Synthesis, vol. 29, page 24); however, with this catalyst somewhat higher minimal temperatures are required, the more practical range being 70° to 200° C. As in the case of platinum, excessive heat leads to by-product formation by hydrogenolysis. With Raney nickel we prefer to use such solvents as the lower alkanols, e. g. methanol, ethanol, isopropanol, butanol and the like.

For the synthesis of 1,4a-dimethyl-7-hydroxyperhydrophenanthrene-1-carboxylic acid we prefer to hydrogenate 1,4a - dimethyl - 1 - methoxycarbonyl - 1,2,3,4,4a,4b,5,6,7,9,10,10a-dodecahydro-7-phenanthrone (cf. Harris and Sanderson, J. Am. Chem. Soc., vol. 70, page 342; 1948) in the presence of a catalyst such as described before followed by hydrolysis of the resulting methyl ester of 1,4a - dimethyl - 7 - hydroxyperhydrophenanthrene - 1-carboxylic acid.

The following examples illustrate in detail some of the procedures used for practicing this invention and the products produced thereby. However, this invention is not to be construed as limited in spirit or in scope by the details set forth. In these examples temperatures are given in degrees centigrade, vacuum distillation pressures in millimeters of mercury, and relative amounts of materials in parts by weight.

Example 1

A mixture of 50 parts of podocarpic acid, 1.5 parts of platinic oxide, and 250 parts of glacial acetic acid is shaken at 80° C. in an atmosphere of hydrogen under 55 atmospheres pressure until hydrogenation ceases. The catalyst is removed by filtration and the acetic acid is stripped under reduced pressure. The glassy residue is refluxed for an hour with a mixture of 50 parts of potassium hydroxide, 200 parts of methanol and 50 parts of water. The mixture is cooled and then acidified with 10% hydrochloric acid. An oil separates which solidifies on standing. This solid is collected and repeatedly recrystallized from aqueous isopropanol. The 1,4a-dimethyl-6-hydroxyperhydrophenanthrene-1-carboxylic acid is obtained in the form of transparent platelets which melt at about 234–235.2° C. The compound has no appreciable absorption in the ultraviolet range from 250–300 millimicrons. The specific optical rotation is $+23°$ when determined in a 1% absolute ethanol solution.

Example 2

To a solution of 100 parts of 1,4a-dimethyl-6-hydroxyperhydrophenanthrene-1-carboxylic acid and 16 parts of sodium hydroxide in 160 parts of water and 160 parts of 95% ethanol are added 31.1 parts of dimethyl sulfate. The reactants are quickly mixed and then allowed to stand for one hour. The mixture is diluted with water and extracted with ether. The ether extract is washed with 10% sodium hydroxide and then with water until neutral. The ether solution is dried over anhydrous sodium sulfate. After filtration, the solvent is stripped and the residue is distilled from a short-path apparatus to give 1,4a-dimethyl-1-methoxycarbonylperhydro-6-phenanthrol as a colorless, viscous liquid which boils at about 155° C. at 0.15 mm. pressure.

Example 3

In a vessel equipped with an efficient stirrer, a reflux condenser and means for excluding moisture such as a drying tube, is placed a mixture of 10 parts of lithium aluminum hydride and 100 parts of anhydrous ether. A solution of 1 part of 1,4a-dimethyl-6-hydroxyperhydrophenanthrene-1-carboxylic acid in 50 parts of dry ether is added at such a rate that the capacity of the condenser is not exceeded. The mixture is stirred and refluxed for 3 days after the addition is completed. The excess of lithium aluminum hydride is decomposed by the cautious addition, first of ethyl acetate and then of water and then of 10% hydrochloric acid. The ether layer is separated and washed successively with 10% aqueous hydrochloric acid, water, 10% aqueous sodium hydroxide, and then again with water until the washings are neutral. The ether solution is then separated, dried over anhydrous calcium sulfate, filtered and evaporated to yield 1,4a-dimethyl - 1 - hydroxymethylperhydro-6-phenanthrol as a colorless gas. The compound is further purified by distillation from a short-path apparatus at about 155° C. and 0.05–0.1 mm. pressure. The infrared absorption spectrum of this compound has strong bands at 2.76 and 7.25 microns. The same compound is also obtained by hydrogenation of podocarpinol under the conditions of Example 1.

Example 4

To a well-stirred mixture of 106 parts of 1,4a-dimethyl - 6 - hydroxyperhydrophenanthrene - 1 - carboxylic acid and a solution of 37.8 parts of sodium dichromate in 310 parts of water are added dropwise 64.5 parts of concentrated sulfuric acid. During the introduction of the acid the reaction mixture is maintained at 55–60° C. by regulation of the rate of addition. The mixture is stirred for 15 minutes after the addition is completed and then cooled and extracted with ether. The ether extract is washed with 10% aqueous hydrochloric acid and then with water until the extract is neutral. The ether solution is then dried over sodium sulfate, filtered and evaporated to yield a yellow viscous residue. The 1,4a - dimethyl - 6 - oxoperhydrophenanthrene - 1 - carboxylic acid is purified by sublimation in a short-path, cold-finger sublimation apparatus. Further purification can be accomplished by recrystallization from aqueous methanol. The compound is thus obtained in the form of transparent needles melting at about 168–174° C. The specific optical rotation of this substance is +35° as determined in a 1% ethanolic solution. The infrared absorption spectrum has well-defined bands at 5.82, 6.86, and 6.93 microns and a broad band at 5.95 microns. The ultraviolet absorption spectrum contains no pronounced maxima between 240 and 300 millimicrons.

Example 5

To a solution of 150 parts of 1,4a-dimethyl-6-oxoperhydrophenanthrene-1-carboxylic acid and 200 parts of sodium hydroxide in a mixture of 2000 parts of water and 4000 parts of methanol are added 100 parts of dimethyl sulfate. The mixture is heated to reflux and is then allowed to stand for several hours, after which it is diluted with water and allowed to stand until the ester solidifies. The solid is collected on a filter, washed with water and recrystallized from aqueous methanol. The 1,4a - dimethyl - 1 - methoxycarbonylperhydro - 6 - phenanthrone is obtained as feathered needles melting at about 110–113° C.

Example 6

To a solution of 20 parts of 1,4a-dimethyl-6-hydroxyperhydrophenanthrene-1-carboxylic acid are added 20 parts of acetic anhydride and 1 part of acetyl chloride. This mixture is refluxed for 30 minutes and then treated, while still hot, with 50 parts of water. After cooling the reaction mixture is extracted with ether and the extract is then extracted with 5% aqueous sodium hydroxide. The basic extract is neutralized with dilute aqueous hydrochloric acid and the precipitate is collected on a filter. The 1,4a-dimethyl-6-acetoxyperhydrophenanthrene-1-carboxylic acid thus obtained shows absorption bands at 3.0, 5.8, 5.92 and 8.0 microns in the infrared region.

Example 7

To a solution of 3 parts of 1,4a-dimethyl-1-methoxycarbonyl - 1,2,3,4,4a,4b,5,6,7,9,10,10a - dodecahydro - 7- phenanthrone in 33 parts of acetic acid is added 0.4 part of platinic oxide. The mixture is stirred in the presence of one atmosphere of hydrogen until no further uptake of hydrogen is observed. After removal of the catalyst by filtration, nearly all of the acetic acid is distilled off under vacuum. The residue is taken into ether, washed with dilute aqueous sodium hydroxide solution and dried over sodium sulfate. The sodium sulfate is filtered off and the ether is removed under reduced pressure. The viscous residue is distilled at 0.01 mm. pressure and about 120–125° C. to yield 1,4a-dimethyl-1-methoxycarbonyl-7-perhydrophenanthrol.

Example 8

To a solution of 5 parts of potassium hydroxide in 20 parts of ethyl alcohol is added 0.5 part of 1,4a-dimethyl-1-methoxycarbonyl - 7 - perhydrophenanthrol and the mixture is heated to near its boiling point for 6 hours. The alcohol which evaporates is replaced to maintain about the same volume throughout the 6 hour period. The solution is evaporated to about 5 parts, after which 20 parts of water are added and this mixture is heated to about 95° C. for an hour. The reaction mixture is cooled to room temperature and is extracted with 40 parts of ether. The aqueous layer is acidified to a pH of about 2.0 and the gum which is precipitated is taken into 5 parts of ether. This ether solution is dried over anhydrous sodium sulfate and filtered. About 20 parts of petroleum ether are added to the filtrate and the material that precipitates is filtered and dried. The melting point of the 1,4a-dimethyl-7-hydroxyperhydrophenanthrene-1-carboxylic acid thus obtained is 192–194°. The infrared absorption spectrum shows maxima at 2.9 and 5.83 microns.

Example 9

To a solution of 29.5 parts of 1,4a-dimethyl-1-methoxycarbonyl - 1,2,3,4,4a,4b,5,6,7,9,10a - dodecahydro - 7- phenanthrone in 400 parts of ethanol are added 10 parts of catalyst consisting of 5% palladium on charcoal. The mixture is stirred in the presence of an atmosphere of hydrogen until no further uptake is observed. The catalyst is filtered off and the solvent is removed under vacuum. The residue is dissolved in benzene and this solution is applied to a silica gel chromatography column. An appreciable amount of material is eluted from the column with benzene and a 15% solution of ethyl acetate in benzene. Subsequent elution with a 20% solution of ethyl acetate in benzene and concentration of the eluate yields a residue which is dissolved in ether. To this solution petroleum ether is added to the point of turbidity. On standing a crystalline product is obtained which melts at about 96–98° C. The specific rotation of an 0.5% chloroform solution at 25° C. is −17°. The compound is 1,4a-dimethyl-1-methoxycarbonyl-7-oxoperhydrophenanthrene.

Hydrogenation of this 7-ketone with Adams' catalyst by the method of Example 7 yields 1,4a-dimethyl-1-methoxycarbonyl-7-hydroxyperhydrophenanthrene boiling at about 120–125° C. and 0.01 mm. pressure. The specific rotation of a 1.15% ethanol solution at 25° is +74°.

Example 10

To a solution of 10 parts of 1,4a-dimethyl-1-methoxycarbonyl-7-oxoperhydrophenanthrene in 140 parts of ether is added a solution of 3.5 parts of lithium aluminum hydride in 500 parts of ether. After stirring for 1 hour the excess of the reducing agent is destroyed by the addition of 180 parts of ethyl acetate, followed by the addition of 160 parts of 80% ethanol and then 200 parts of water. The ether solution is separated, dried over anhydrous sodium sulfate, filtered and evaporated. The crystalline material is recrystallized from ether, dried and then recrystallized from methanol and water. The resulting crystals melt at about 176–179° C. with previous softening at about 145–146° C. The specific rotation of an 0.46% chloroform solution of this material at 25° is +36.9°. A benzene solution of this compound is applied to a silica gel chromatography column. The column is first washed with chloroform. Elution with a 10% solution of ethyl acetate in chloroform yields two different forms of 1,4a-dimethyl-1-hydroxymethyl-7-hydroxyperhydrophenanthrene. The first form, after crystallization from methanol and water melts sharply at 180–181° C. The second form, after washing with ether and crystallization from methanol and water melts at 141–142° C.; this material is solvated.

1,4a-dimethyl-1 - hydroxymethyl - 7 - hydroxyperhydrophenanthrene is likewise obtained upon reduction with lithium aluminum hydride by the foregoing procedure of 1,4a - dimethyl - 7 - hydroxyperhydrophenanthrene-1- carboxylic acid and its methyl ester.

Example 11

To a solution of 30 parts of 1,4a-dimethyl-7-hydroxyperhydrophenanthrene-1-carboxylic acid and 40 parts of sodium hydroxide in 400 parts of water and 800 parts of methanol are added 23 parts of diethyl sulfate. The mixture is heated to reflux temperature and then permitted to stand at room temperature for 8 hours. Then it is diluted with water and extracted with ether. The ether solution is washed with dilute sodium carbonate solution, dilute hydrochloric acid and water, dried over anhydrous calcium sulfate, filtered and evaporated under reduced pressure. The residue is distilled at about 125–135° C. and 0.01 mm. pressure to yield the 1,4a-dimethyl-1-ethoxycarbonylperhydro-7-phenanthrol.

Example 12

To a solution of 20 parts of 1,4a-dimethyl-6-hydroxyperhydrophenanthrene-1-carboxylic acid in 50 parts of methanol a sufficient quantity of a saturated methanolic solution of potassium hydroxide is added to raise the pH to 8. Then 9 parts of 1-chlorohexane are added and the resulting reaction mixture is refluxed for 4 hours. It is then poured into water and extracted with ether. The ether extract is washed with 10% potassium hydroxide solution and then with water until neutral, dried over anhydrous calcium sulfate, filtered and evaporated to yield an oily residue which is distilled from a short-path apparatus to yield 1,4a-dimethyl-1-hexyloxycarbonylperhydro-6-phenanthrol as a colorless, viscous liquid which boils at about 175° C. and 0.2 mm. pressure.

Example 13

A solution of 20 parts of 1,4a-dimethyl-6-hydroxyperhydrophenanthrene-1-carboxylic acid in 50 parts of methanol is treated with a sufficient amount of a saturated solution of potassium hydroxide in methanol to raise the pH slightly above 7. Then, 10 parts of β-chloroethyldiethylamine are added and the resulting mixture is refluxed for 3 hours. It is then poured into water and extracted with ether. The ether extract is washed with 10% sodium hydroxide and then with water until neutral. It is dried over anhydrous sodium sulfate, filtered and evaporated to yield a yellow residue. Distillation of this residue from a short-path apparatus yields the β-diethylaminoethyl ester of 1,4a-dimethyl-6-hydroxyperhydrophenanthrene-1-carboxylic acid as a light yellow liquid boiling at about 175° C. and 0.15 mm. pressure and having a refractive index ($n_D^{26}$) of 1.5118.

We claim:

1. A member of the class consisting of 1,4a-dimethyl-6-hydroxyperhydrophenanthrene-1-carboxylic acid and 1,4a - dimethyl - 7-hydroxyperhydrophenanthrene-1-carboxylic acid.

2. 1,4a - dimethyl - 6 - hydroxyperhydrophenanthrene-1-carboxylic acid.

3. 1,4a-dimethyl - 7 - hydroxyperhydrophenanthrene-1-carboxylic acid.

4. The process of preparing 1,4a-dimethyl-6-hydroxyperhydrophenanthrene-1-carboxylic acid which comprises the agitation of podocarpic acid in a hydrogen atmosphere in the presence of a member of the class consisting of Adams' catalyst and Raney nickel, the reduction being conducted at a temperature of 35–150° C. where Adams' catalyst is used and at a temperature of 70–200° C. where Raney nickel is used.

5. The process of preparing 1,4a-dimethyl-6-hydroxyperhydrophenanthrene-1-carboxylic acid which comprises the agitation of podocarpic acid dissolved in a lower alkanoic acid in the presence of Adams' catalyst in a hydrogen atmosphere at a temperature of 35–150° C.

6. The process of preparing 1,4a-dimethyl-6-hydroxyperhydrophenanthrene-1-carboxylic acid which comprises the agitation of podocarpic acid dissolved in acetic acid in the presence of Adams' catalyst in a hydrogen atmosphere at a temperature of 35–150° C.

7. The process of preparing 1,4a-dimethyl-6-hydroxyperhydrophenanthrene-1-carboxylic acid which comprises the agitation of podocarpic acid dissolved in a lower alkanol in the presence of Raney nickel in a hydrogen atmosphere at a temperature of 70–200° C.

8. The process of preparing 1,4a-dimethyl-6-hydroxyperhydrophenanthrene-1-carboxylic acid which comprises the agitation of podocarpic acid dissolved in ethanol in the presence of Raney nickel in a hydrogen atmosphere at a temperature of 70–200° C.

References Cited in the file of this patent

UNITED STATES PATENTS

| | | |
|---|---|---|
| 2,132,193 | Schuster et al. | Oct. 4, 1938 |
| 2,478,978 | Picha | Aug. 16, 1949 |
| 2,534,466 | Miescher et al. | Dec. 19, 1950 |
| 2,570,582 | Miescher et al. | Oct. 9, 1951 |
| 2,675,390 | Rosenblatt | Apr. 13, 1954 |

UNITED STATES PATENT OFFICE

CERTIFICATE OF CORRECTION

Patent No. 2,796,431 June 18, 1957

Roy H. Bible, Jr. et al.

It is hereby certified that error appears in the printed specification of the above numbered patent requiring correction and that the said Letters Patent should read as corrected below.

Column 3, line 11, for "gas" read -- glass --; column 4, line 38, for "1,2,3,4,4a,4b,5,6,7,9,10a-" read -- 1,2,3,4,4a,4b,5,6,7,9,10,10a- --.

Signed and sealed this 10th day of September 1957.

(SEAL)
Attest:

KARL H. AXLINE
Attesting Officer

ROBERT C. WATSON
Commissioner of Patents